(12) United States Patent
Zorn et al.

(10) Patent No.: US 10,102,241 B2
(45) Date of Patent: Oct. 16, 2018

(54) DETECTING ERRORS IN SPREADSHEETS

(71) Applicant: Microsoft Technology Licensing, LLC, Redmond, WA (US)

(72) Inventors: Benjamin G. Zorn, Woodinville, WA (US); Emery Berger, Amherst, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 243 days.

(21) Appl. No.: 15/161,119

(22) Filed: May 20, 2016

(65) Prior Publication Data

US 2017/0337238 A1  Nov. 23, 2017

(51) Int. Cl.
*G06F 17/30* (2006.01)

(52) U.S. Cl.
CPC .... *G06F 17/30371* (2013.01); *G06F 17/3056* (2013.01)

(58) Field of Classification Search
CPC ............ G06F 17/212; G06F 17/246; G06F 17/30067; G06F 17/30286; G06F 17/30371; G06F 17/3056; G06F 11/00
USPC ........ 707/687, 690, 691, 700, 701; 715/212, 715/218, 219
See application file for complete search history.

(56) References Cited

U.S. PATENT DOCUMENTS

| 5,842,180 | A | 11/1998 | Khanna et al. |
| 6,986,099 | B2 | 1/2006 | Todd |
| 7,117,430 | B2 | 10/2006 | Maguire, III et al. |
| 9,069,725 | B2 | 6/2015 | Jones |
| 2002/0004801 | A1* | 1/2002 | Todd ..................... G06F 17/246 715/212 |
| 2002/0059203 | A1* | 5/2002 | Witkowski ........ G06F 17/30412 |
| 2002/0161799 | A1* | 10/2002 | Maguire, III ......... G06F 17/246 715/212 |
| 2004/0133568 | A1* | 7/2004 | Witkowski ............ G06F 17/246 |
| 2010/0049723 | A1 | 2/2010 | Aebig et al. |

(Continued)

OTHER PUBLICATIONS

Abraham, et al., "GoalDebug: A Spreadsheet Debugger for End Users", In Proceedings of the 29th international conference on Software Engineering, May 24, 2007, pp. 1-10.

(Continued)

*Primary Examiner* — Greta L Robinson
(74) *Attorney, Agent, or Firm* — Jacob P. Rohwer; Newport IP, LLC

(57) ABSTRACT

The techniques described herein use statistical reasoning to determine whether a spreadsheet (e.g., cells) includes potential errors. The techniques determine a partition within a spreadsheet where the partition includes cells that share characteristics (e.g., same row or column, same type of content, same formatting, etc.). Once determined, the partition is evaluated based on defined properties. A property is applied to generate property values so that an anomaly can be identified. An anomaly can occur when a cell in the partition has a property value that is inconsistent with other property values of other cells in the same partition (e.g., an intra-partition anomaly). An anomaly can also occur when a cell in the partition has a property value that is inconsistent with property values of cells in a different partition (e.g., an inter-partition anomaly). The techniques analyze the anomalies to determine a priority value indicative of a likelihood of a potential error.

20 Claims, 8 Drawing Sheets

(56) References Cited

U.S. PATENT DOCUMENTS

| | | | |
|---|---|---|---|
| 2012/0137204 A1 | 5/2012 | Petrovicky et al. | |
| 2015/0039537 A1 | 2/2015 | Peev et al. | |
| 2015/0254226 A1* | 9/2015 | Renshaw | G06F 17/246 715/219 |
| 2016/0055139 A1 | 2/2016 | Creason et al. | |
| 2017/0228358 A1* | 8/2017 | Hirzel | G06F 17/246 |
| 2017/0329984 A1* | 11/2017 | Clough | G06F 21/6227 |

OTHER PUBLICATIONS

Abraham, et al., "Header and Unit Inference for Spreadsheets through Spatial Analyses", In Proceedings of IEEE Symposium on Visual Languages and Human Centric Computing, Sep. 30, 2004, 8 pages.

Abraham, et al., "How to Communicate Unit Error Messages in Spreadsheets", In Proceedings of 1st Workshop on End-User Software Engineering, May 21, 2005, pp. 1-5.

Abraham, et al., "Inferring Templates from Spreadsheets", In Proceedings of the 28th International conference on Software engineering, May 20, 2006, pp. 182-191.

Abreu, et al., "Constraint-based Debugging of Spreadsheets", In Proceedings of the XV Iberoamerican Conference on Software Engineering, Apr. 24, 2012, 14 pages.

Abreu, et al., "Smelling Faults in Spreadsheets", In Proceedings of IEEE International Conference on Software Maintenance and Evolution, Sep. 29, 2014, 10 pages.

Ahmad, et al., "A Type System for Statically Detecting Spreadsheet Errors", In Proceedings of 18th IEEE International Symposium on Automated Software Engineering, Oct. 6, 2003, pp. 1-10.

Badame, et al., "Refactoring Meets Spreadsheet Formulas", In proceedings of 28th IEEE International Conference on Software Maintenance, Sep. 23, 2012, pp. 399-409.

Barowy, et al., "CheckCell: Data Debugging for Spreadsheets", In Proceedings of the ACM International Conference on Object Oriented Programming Systems Languages & Applications, Oct. 19, 2014, 17 pages.

Barowy, et al., "FlashRelate: Extracting Relational Data from Semi-Structured Spreadsheets Using Examples", In Proceedings of the 36th ACM SIGPLAN Conference on Programming Language Design and Implementation, Jun. 13, 2015, pp. 1-11.

Bishop, et al., "Spreadsheet End-User Behaviour Analysis", In Proceedings of European Spreadsheet Risks Interest Group, Jul. 10, 2008, pp. 141-152.

Bolton, et al., "Statistical Fraud Detection: A Review", In Journal of Statistical Science, vol. 17, Issue 3, Aug. 2002, pp. 235-255.

Butler, Raymond J., "Is This Spreadsheet a Tax Evader? How HM Customs and Excise Test Spreadsheet Applications", In Proceedings of the 33rd Hawaii International Conference on System Sciences, Jan. 4, 2000, pp. 1-6.

Chambers, et al., "Automatic detection of dimension errors in spreadsheets", In Journal of Visual Languages and Computing, vol. 20 Issue 4, Aug. 2009, pp. 1-15.

Cunha, et al., "Smellsheet Detective: A Tool for Detecting Bad Smells in Spreadsheets", In Proceedings of IEEE Symposium on Visual Languages and Human-Centric Computing, Sep. 30, 2012, pp. 1-2.

Cunha, et al., "Towards a Catalog of Spreadsheet Smells", In Proceedings of the 12th international conference on Computational Science and Its Applications, Jun. 18, 2012, pp. 1-15.

Emden, et al., "Java Quality Assurance by Detecting Code Smells", In Proceedings of the Ninth Working Conference on Reverse Engineering, Oct. 29, 2002, 10 pages.

Engels, et al., "ClassSheets: Automatic Generation of Spreadsheet Applications from Object-Oriented Specifications", In Proceedings of the 20th IEEE/ACM international Conference on Automated software engineering, Nov. 7, 2005, 10 pages.

Erwig, et al., "Adding Apples and Oranges", In Proceedings of the 4th International Symposium on Practical Aspects of Declarative Languages, Jan. 19, 2002, 18 pages.

Hermans, et al., "Detecting Code Smells in Spreadsheet Formulas", In Proceedings of 28th IEEE International Conference on Software Maintenance, Sep. 23, 2012, pp. 409-418.

Hewlett Packard Enterprise, "Fortify Static Code Analyzer", Retrieved on: Mar. 9, 2016 Available at: http://www8.hp.com/us/en/software-solutions/static-code-analysis-sast/ 5 pages.

Igarashi, et al., "Fluid Visualization of Spreadsheet Structures", In Proceedings of IEEE Symposium on Visual Languages, Sep. 1998, 8 pages.

Jannach, et al., "Avoiding, Finding and Fixing Spreadsheet Errors—a Survey of Automated Approaches for Spreadsheet QA", In Journal of Systems and Software, vol. 94, Aug. 2014, pp. 1-69.

Panko, Raymond R., "Applying Code Inspection to Spreadsheet Testing", In Journal of Management Information Systems, vol. 16, Issue 2, Sep. 1, 1999, pp. 159-176.

Panko, Raymond R., "What We Know about Spreadsheet Errors", In Journal of End User Computing, vol. 10, Issue 2, May 1, 1998, pp. 15-21.

Powell, et al., "A Critical Review of the Literature on Spreadsheet Errors", In Journal of Decision Support Systems, vol. 46, Issue 1, Dec. 2008, 11 pages.

Powell, et al., "Errors in Operational Spreadsheets", In Journal of Organizational and End User Computing, vol. 21, Issue 3, Jul. 2007, pp. 24-36.

Wikipedia, "Benford's Law", Retrieved on: Mar. 9, 2016 Available at: https://en.wikipedia.org/wiki/Benford%27s_law, 15 pages.

Wikipedia, "Microsoft Excel", Published on: Sep. 30, 1985, Available at: https://en.wikipedia.org/wiki/Microsoft_Excel, 18 pages.

* cited by examiner

DETECTING ERRORS IN SPREADSHEETS

BACKGROUND

Spreadsheets are used in a variety of industries to organize, calculate, and present different types of information. For instance, spreadsheets have proven to be a great resource for capturing and organizing financial data so that it is easier for people to understand and/or manipulate. However, spreadsheets often contain errors in the data and/or the formulas contained in the cells of the spreadsheet. With respect to financial data, these errors can lead to significant financial loss.

Existing techniques for detecting errors in spreadsheets include: (i) explicitly defining a fixed set of rules that check cells of a spreadsheet for common patterns of errors, (ii) using a programming language to infer types of content in cells of a spreadsheet and alerting a user of possible type violations, (iii) applying software engineering metrics to underlying source code of a spreadsheet to identify a symptom in the source code that indicates a deeper problem (e.g., identifying a code "smell" associated with a spreadsheet), and (iv) checking whether a specific data value in a cell of a spreadsheet is an outlier. However, the existing techniques mentioned above fail to effectively handle false positives. That is, the existing techniques often detect a possible error even though the data and/or the formula contained in the cell is what a user intended it to be.

SUMMARY

The techniques described herein use statistical reasoning to effectively evaluate cells in a spreadsheet and determine whether the cells likely contain an error in the data and/or formulas contained therein. The statistical reasoning can be implemented with respect to a subset of a total number of cells being used in the spreadsheet. Moreover, the statistical reasoning can evaluate a cell based on different characteristics and/or properties, and thus, a priority value indicative of a likelihood that the cell contains a potential error can be determined based on multiple evaluations (e.g., iterations), as further described herein. Consequently, the techniques of the present disclosure provide a more thorough and a more robust approach to detecting errors in spreadsheets compared to the existing techniques because they are able to eliminate and/or reduce the chance of detecting a false positive.

In various implementations, the techniques determine a partition within a spreadsheet where the partition includes cells that share one or more defined characteristics (e.g., cells that are in the same row, cells that are in the same column, cells that contain the same type of content, cells that have the same formatting, etc.). Accordingly, in various examples, a partition includes a subset of a total number of cells in the spreadsheet that are targeted based on the one or more defined characteristics. Once determined, the partition is evaluated based on one or more properties defined for the partition. A property is applied to generate property values for the cells in the partition so that an anomaly can be identified. In one example, an anomaly can occur when a cell in the partition has a property value that is inconsistent with other property values of other cells in the same partition (e.g., an intra-partition anomaly as further described herein). In another example, an anomaly can occur when a cell in the partition has a property value that is inconsistent with property values of cells in a different partition (e.g., an inter-partition anomaly as further described herein). For instance, the cell can be inconsistent with respect to a similarly situated cell in the different partition, where the similarly situated cell can be a corresponding cell in the same position of the different partition (e.g., if columns are the characteristic used to determine/separate partitions then cell A1 and B1 are similarly situated because they are both in the first row of their respective partitions, A and B). In yet another example, an anomaly can occur when a property value calculated for a partition is inconsistent with a corresponding property value calculated for another partition (e.g., an average in-degree or an average out-degree, as further described herein). In some implementations, an inconsistent property value calculated for the partition can be used as a signal to further evaluate individual property values generated for the respective cells within the partition to identify a cell that contains a potential error that has a large effect on the inconsistent property value (e.g., a cell that is the source of the reason for the inconsistency).

The techniques use one or more anomalies to determine that a cell contains a potential error or to determine a priority value indicative of a likelihood that the cell contains a potential error (e.g., a confidence indication). In some instances, the techniques rank potential errors based on priority values and notify a user of the higher ranked or the higher priority errors (e.g., the five or ten most likely errors in a spreadsheet). In this way, the user evaluating a large spreadsheet which contains a voluminous amount of data and/or formulas, for example, can focus his or her attention and efficiently examine the higher ranked or the higher priority errors and determine whether there actually is an issue that needs to be resolved or fixed within a cell and/or within a partition.

The techniques can also (i) change the properties used to identify anomalies within a previously determined partition and/or (ii) change the characteristics used to determine a different partition so that it can be evaluated using properties. In one example, a shared characteristic for the cells is rows (e.g., row 1, 2, 3, 4, and so forth), and thus, cells that are in a same row of a spreadsheet can be a partition for evaluation purposes. In another example, a shared characteristic for the cells is columns (e.g., column A, B, C, D, and so forth), and thus, cells that are in a same column of a spreadsheet can be a partition for evaluation purposes. Accordingly, the techniques can collect and evaluate an aggregation of identified anomalies using different partitions evaluated in light of different properties so that a more confident priority value indicative of a likelihood that a particular cell comprises a potential error can be determined. This eliminates and/or reduces the chance of detecting a false positive.

In various implementations, characteristics defined to determine partitions can relate to a spatial structure and can include, for example: rows, columns, blocks (e.g., a 2×2 cell block, a 4×2 cell block, a 4×4 cell block, etc.), and so forth. In some instances, a partition can include all the cells in the spreadsheet. In additional or alternative implementations, characteristics defined to determine partitions can relate to a type of content contained in a cell and can include, for example: a numeric value, a text string, a formula (e.g., an algorithm, an equation, etc.), and so forth. In further implementations, characteristics defined to determine partitions can relate to a cell format and can include, for example: a highlight (e.g., a background color of the cell), a content color (e.g., a color of the numbers or text in the cells), hidden content, a type of font, bolded content, and so forth. In yet even further implementations, characteristics defined to determine partitions can relate to semantic units or a semantic structure and can include, for example: dates (e.g., "mm/dd/yyyy", "dd/mm/yyyy", etc.), money (e.g., "$", "£", etc.), populations (e.g., "ppl"), weight (e.g., "lbs", "kg', etc.), height (e.g., "ft", "in", "cm"), and so forth.

In various examples, a property defined for a partition that is applied to generate property values from which an anomaly can be identified can include one of: an existence of content in a cell (e.g., whether a cell contains content or is empty), a type of content in a cell (e.g., a numeric value, a text string, a formula, etc.), a specific range of values in a cell, a most significant digit of a cell (e.g., the first digit of a numeric value), a semantic unit or a semantic structure of a cell (e.g., "$","mm/dd/yyyy", "ppl", "lbs", etc.), a length of the content in a cell (e.g., a number of characters, a number of digits, a number of letters, etc.), a cell format (e.g., a specific cell highlight color, a specific color of content, whether or not content is hidden, whether or not content is bolded or underlined, a type of font, etc.), whether a formula uses a particular operation (e.g., an addition operation, a subtraction operation, a multiplication operation, a division operation, etc.). In at least some of these examples, a property value generated is a Boolean value such that if an individual cell satisfies the property defined for the partition then the property value is "one" or "true" and if the individual cell does not satisfy the property defined for the partition then the property value is "zero" or "false". In further examples, a property can be based on dependencies (e.g., between cells). For instance, a property can comprise a number of times a cell uses or imports content from another cell (e.g., an in-degree integer number) or a number of times content of a cell is used by or exported to another cell (e.g., an out-degree integer number). A property can also be defined and/or summarized for a whole partition based on property values contributed by individual cells of the partition. For instance, an average in-degree property value can be calculated for the whole partition (e.g., multiple cells) based on the various in-degree numbers determined for individual cells included in the partition. Or, an average out-degree property value can be calculated for the partition based on the various our-degree numbers determined for individual cells included in the partition.

This Summary is provided to introduce a selection of concepts in a simplified form that are further described below in the Detailed Description. This Summary is not intended to identify key or essential features of the claimed subject matter, nor is it intended to be used to limit the scope of the claimed subject matter.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

Figure 1:
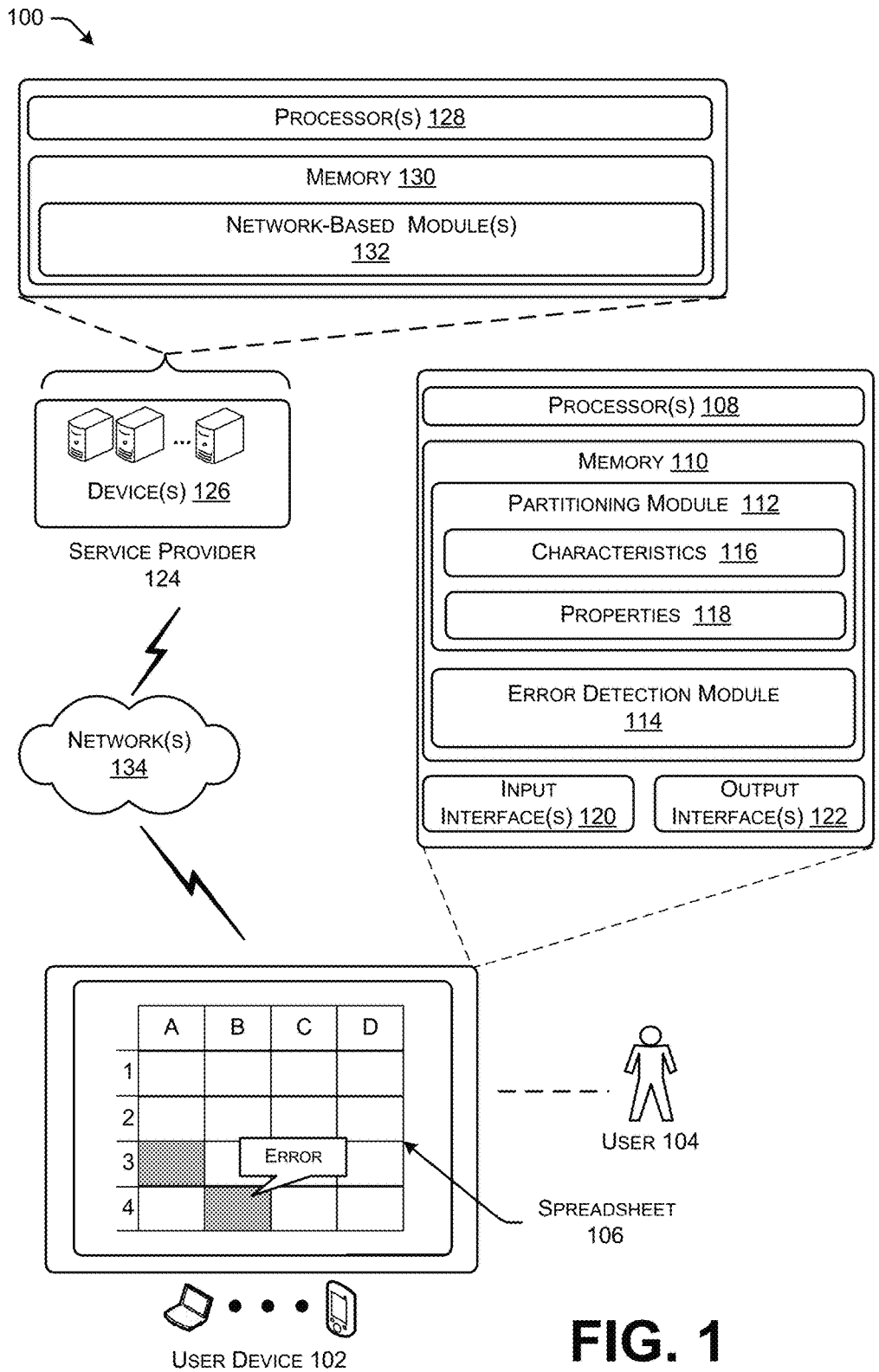
FIG. 1 illustrates an example environment in which potential errors in a spreadsheet can be detected using partition(s) determined using one or more characteristics, the partition(s) evaluated based on one or more properties defined for the partition(s).

Described herein are techniques that detect potential errors in spreadsheets using statistical reasoning associated with data and/or data operations that are inconsistent and/or unusual (e.g., anomalous). The techniques define one or more characteristics useable to determine a partition (e.g., divide cells of a spreadsheet into separate partitions), where the cells included in an individual partition share the one or more characteristics (e.g., same row, same column, same type of data, same type of format, etc.). The techniques also define one or more properties that can be applied to cells to generate (e.g., compute, calculate, etc.) property values for a partition.

In various examples, the property values can be evaluated for an individual partition to determine an intra-partition anomaly, in which a property value for an individual cell is inconsistent with property values of other cells in the same partition. In additional and/or alternative examples, the property values can be evaluated across multiple partitions to determine an inter-partition anomaly, in which (i) a property value for an individual cell is inconsistent with property values of other cells in other partitions (e.g., similarly situated cells) or (ii) a property value for an individual partition is inconsistent with property values of other partitions.

In one implementation, a property value is inconsistent with, or anomalous to, other property values if the property value does not match the other property values (e.g., the property value does not match the most common property value, the property value does not match the expected property value, etc.). In another implementation, a property value is inconsistent with, or anomalous to, other property values if the property value is an outlier value that is not within a threshold distance of other property values (e.g., the outlying property value is outside a predefined percentage of a most common property value or an expected property value, the outlying property value is outside a first or second standard deviation band established based on a mean value, etc.). In yet another implementation, a property value is inconsistent with, or anomalous to, other property values if the property value is not what was expected (e.g., the property value is not a predefined number, the property value is not within a range of predefined numbers, the property value is not one of one or multiple predefined text strings, etc.). Therefore, in various examples, the techniques are configured to determine a statistical distribution of a partition based on the generated property values associated with the cells of the partition and use the statistical distribution to identify an anomaly (e.g., an intra-partition anomaly). Further, the techniques are configured to compare the statistical distribution of the partition to other statistical distributions of other partitions to identify an anomaly (e.g., an inter-partition anomaly).

Consequently, the techniques described herein have the ability to reason systematically and statistically about the content and layout of cells in a spreadsheet. For instance, the techniques can define characteristics that target a subset of a total number of cells and evaluate the cells based on defined properties, so that anomalies can be identified and used to determine a likelihood of a potential error.

FIG. 1 illustrates an example environment 100 in which potential errors in a spreadsheet can be detected using partition(s). FIG. 1 illustrates a user device 102 being operated by a user 104. The user device 102 is configured to display a spreadsheet 106 generated by a spreadsheet application. The spreadsheet application is configured to notify the user 104 of potential errors in the spreadsheet. As seen in FIG. 1, the spreadsheet application can provide some sort of visual distinction to notify the user 104 of the potential error such as a highlighted cell (e.g., cell A3 and cell B4) and/or an error notification (e.g., associated with cell B4).

As described above, the potential errors are detected in spreadsheets using statistical reasoning associated with data and/or data operations that are inconsistent (i.e., anomalous). Thus, the spreadsheet application includes a tool that defines a characteristic used to determine partitions, where the cells included in an individual partition share the characteristic (e.g., same row, same column, same type of data, same format, etc.). Then, the tool defines a property that is useable, or can be applied, to generate (e.g., compute) property values for the partitions. The statistical reasoning used to detect the potential errors can then be implemented by evaluating the property values.

In one implementation, the spreadsheet application is installed and/or executed on the user device 102. The user device 102 can include any device, including, without limitation, a personal computer device, a laptop computer device, a desktop computer device, a portable digital assistant (PDA) device, a mobile phone device, a smartphone device, a tablet computer device, an electronic book (eBook) reader device, a set-top box device, a game console device, a smart television device, a wearable device (e.g., a smart watch, electronic "smart" glasses, a fitness tracker, etc.), or any other electronic device. The user device 102 can include processor(s) 108 and memory 110. Processor(s) 108 can be a single processing unit or a number of units, each of which could include multiple different processing units. The processor(s) 108 can include a microprocessor, a microcomputer, a microcontroller, a digital signal processor, a central processing unit (CPU), a graphics processing unit (GPU), etc. Alternatively, or in addition, some or all of the techniques described herein can be performed, at least in part, by one or more hardware logic components. For example, and without limitation, illustrative types of hardware logic components that can be used include a Field-Programmable Gate Array (FPGA), an Application-Specific Integrated Circuit (ASIC), an Application-Specific Standard Products (ASSP), a state machine, a Complex Programmable Logic Device (CPLD), other logic circuitry, a system on chip (SoC), and/or any other devices that perform operations based on instructions. Among other capabilities, the processor(s) 108 can be configured to fetch and execute computer-readable instructions stored in the memory 110.

The memory 110 can include one or a combination of computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, phase change memory (PCM), static random-access memory (SRAM), dynamic random-access memory (DRAM), other types of random access memory (RAM), read only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media includes computer-readable instructions, data structures, program modules, or other data in a modulated data signal, such as a carrier wave. As defined herein, computer storage media does not include communication media.

The memory 110 can also include an operating system configured to manage hardware and services within and coupled to the user device 102. By way of example, the memory 110 can include a partitioning module 112 and an error detection module 114, each of which can be executed in association with the tool to detect errors in spreadsheets and each of which is further described herein. In various examples, the partitioning module 112 and/or the error detection module 114 may be part of a spreadsheet application, while in others examples, the partitioning module 112 and/or the error detection module 114 can be part of a tool that is not part of a spreadsheet application but that is used by the spreadsheet application to detect errors. As used herein, the term "module" is intended to represent example divisions of executable instructions for purposes of discussion, and is not intended to represent any type of requirement or required method, manner or organization. Accordingly, while various "modules" are described, their functionality and/or similar functionality could be arranged differently (e.g., combined into a fewer number of modules, broken into a larger number of modules, etc.). Further, while certain functions and modules are described herein as being implemented by software and/or firmware executable on a processor, in other embodiments, any or all of the modules can be implemented in whole or in part by hardware (e.g., a specialized processing unit, etc.) to execute the described functions. In various implementations, the modules described herein in association with the user device 102 can be executed across multiple devices.

The partitioning module 112 is configured to receive a spreadsheet and determine (e.g., create) a partition, or a group of cells in the spreadsheet that share a defined characteristic 116. For instance, the partitioning module 112 can select the characteristic 116 from a group of known characteristics 116 stored in association with the partitioning module 112. The selection of a characteristic 116 can be made automatically by the partitioning module 112 as part of an automated statistical reasoning approach to detecting errors in spreadsheets (e.g., a machine learning approach that determines effective characteristics to use based on explicit or implicit user feedback indicative of the quality of error detection). Alternatively, the selection of a characteristic 116 can be made based on user input (e.g., provided with respect to a specific spreadsheet, provided as a general rule applicable to a set of spreadsheets typically generated and/or used by a user, etc.).

In various examples, a characteristic 116 can relate to a spatial structure of the spreadsheet. More specifically, in one example, a characteristic 116 can comprise a row characteristic, such that the cells in an individual partition belong to a same row. In another example, a characteristic 116 can comprise a column characteristic, such that the cells in an individual partition belong to a same column. In yet another example, a characteristic 116 can comprise a neighboring characteristic, such that the cells in an individual partition belong to a neighboring block of cells (e.g., a 2×2 cell block, a 4×2 cell block, a 4×4 cell block, etc.). In a further example, a characteristic 116 can comprise a border characteristic, such that the cells in an individual partition are on an edge (e.g., top, bottom, left, right) of the spreadsheet (e.g., a border of the spreadsheet). In some instances, a partition can include all the cells in the spreadsheet or a partition can include an individual cell of the spreadsheet.

In other examples, a characteristic 116 can relate to a type of content contained in a cell of the spreadsheet, such that the cells in an individual partition have a same type of content. For instance, a characteristic 116 can comprise one of a numeric value characteristic (e.g., an integer, a real number, a decimal number, etc.), a string characteristic (e.g., a text string), a formula characteristic (e.g., an algorithm, an equation, etc.), and so forth. A characteristic 116 can also comprise a cell format, such that a partition includes cells in the spreadsheet that share a same cell format. More specifically, in one example, a characteristic 116 can comprise a highlight characteristic (e.g., a background color of the cell). In another example, a characteristic 116 can comprise a content color characteristic (e.g., a color of the numbers and/or text in the cells). In yet another example, a characteristic 116 can comprise a hidden content characteristic (e.g., whether the content of a cell is hidden from view). Other formatting characteristics can comprise a type of content characteristic and/or a bolded content characteristic.

In further examples, a characteristic 116 can comprise a semantic unit or a semantic structure characteristic, such that cells in a partition have a same semantic unit or a same semantic structure (e.g., "$", "mm/dd/yyyy", "ppl", "lbs", etc.). Or, a characteristic 116 can relate to how a cell is used (e.g., whether or not a cell contributes to a formula, whether or not a cell contains a function that returns a specified value if the formula evaluates to an error, etc.).

The partitioning module 112 is also configured to define a property 118 for a partition and generate property values based on the defined property 118. For instance, the partitioning module 112 can select the property 118 from a group of known properties 118 stored in association with the partitioning module 112. The selection of a property 118 can be made automatically by the partitioning module 112 as part of an automated statistical reasoning approach to detecting errors in spreadsheets (e.g., a machine learning approach that determines effective properties to use based on explicit or implicit user feedback indicative of the quality of error detection). Alternatively, the selection of a property 118 can be made based on user input (e.g., provided with respect to a specific spreadsheet, provided as a general rule applicable to a set of spreadsheets typically generated and/or used by a user, etc.). In various examples, a property 118 can provide a numeric representation of a cell and/or a partition. In various examples, a property can be a function of a cell that, when applied, produces a value (e.g., is the cell content in a bold format, is a number negative, etc.) that can be accumulated, summarized (e.g., property values from a set of cells you can be used to compute a new combined value) and/or compared. In some examples, a property can be evaluated before and/or after execution of a formula in a cell to generate a property value.

The partitioning module 112 can further generate multiple partitions, each of which can have multiple defined properties, and can combine the property values from the various partitions in a meaningful way.

In various examples, a property 118 comprises one of: an existence of content (e.g., whether a cell is filled or empty), a type of content (e.g., a numeric value, a text string, a formula, etc.), a specific range of values, a most significant digit (e.g., a specific digit), a semantic unit, a semantic structure, a length of content (e.g., a number of characters, a number of digits in a numeric value, a number of letters in a string of text, etc.), a cell format (e.g., a specific highlight color, a specific color of content, whether or not content is hidden from view, etc.), use of an operation in a formula (e.g., an addition operation, a subtraction operation, a multiplication operation, a division operation, and so forth). A property value generated using some of the aforementioned defined properties 118 can be a Boolean value such that if an individual cell satisfies the property defined for the partition then the property value is "one" or "true" and if the individual cell does not satisfy the property defined for the partition then the property value is "zero" or "false".

In various examples, a property 118 can relate to dependencies within spreadsheets. For instance, a property 118 can comprise one of: a number of times a cell uses content from other cells (e.g., an in-degree integer) or a number of times content of a cell is used by other cells (e.g., an out-degree integer).

A property 118 can also relate to partitions such that the generated property values can be summarized for an individual partition and the summaries can be compared across partitions. For example, a property 118 can comprise an average in-degree number for a partition which is calculated based on the individual in-degree integers generated with respect to the individual cells that comprise the partition. In another example, a property 118 can comprise an average out-degree number for a partition which is calculated based on the individual out-degree integers generated with respect to the individual cells that comprise the partition.

In some implementations, the direction of a dependency can be a property 118 (e.g., whether an in-degree value is imported from above, below, or from the side of a cell). Additionally or alternatively, a property 118 can relate to whether content of a cell contributes to a graph, whether content of a cell is exported to a different spreadsheet, whether content of a cell is imported from a different spreadsheet, or a height of a dependence tree to which the content of a cell contributes.

The error detection module 114 is configured to analyze the identified anomalies (e.g., intra-partition anomalies and/or inter-partition anomalies) and determine a priority value indicative of a likelihood that a cell, or perhaps a group of cells (e.g., a partition), includes a potential error. In determining the priority value, for example, the error detection module 114 can consider a number of anomalies associated with a particular cell. The number of anomalies can be identified and aggregated across multiple evaluation iterations associated with different defined properties (e.g., the same partition(s) are evaluated) and/or multiple partitioning iterations associated with different characteristics used to determine partition(s) (e.g., may also be referred to herein as a "partitioning session"), where each evaluation iteration defines one or more characteristics 116 to determine a partition and one or more properties 118 useable to evaluate the content of the determined partition and identify anomalies. For example, a higher number of identified anomalies can cause a higher priority value indicating that an individual cell likely contains an error. Moreover, the error detection module 114 can consider whether an anomaly associated with a particular cell is expected, and therefore, the anomaly is not likely a good indication of an error. The expectation can be based on a position or a location of a cell in a spreadsheet. For instance, a higher in-degree number may be expected for a cell or a group of cells at the bottom of a spreadsheet (e.g., the bottom row partition) or at the right of the spreadsheet (e.g., the rightmost column partition) which reflects a typical and acceptable practice of adding cells above or to the left. Or, a cell or a group of cells containing text strings may be expected at the top of a spreadsheet (e.g., to capture column headers).

In some instances, the error detection module 114 can assign different weights to different anomalies when determining a priority value, where the weights are established and vary based on an importance of the one or more characteristics and/or one or more properties used to identify the anomaly.

The error detection module 114 can rank the priority values to determine a subset of potential errors and subsequently output a notification, on the user device 102, of the subset of potential errors. For example, the error detection module 114 can determine priority values that exceed a threshold priority value when determining the subset of potential errors. In various examples, the notification can visually distinguish cells that likely contain a potential error from other cells, as illustrated in FIG. 1.

The user device 102 can include input interface(s) 120 and/or output interface(s) 122. The input interface(s) 120 can enable input via a keyboard, a keypad, a mouse, a pen, a voice input device, a microphone, a touch input device, a touch sensor, a touch screen, a gestural input device, a joystick, a control button, or any other mechanism suitable to generate data defining a user interaction with the user device 102. The output interface(s) 122 can enable the user device 102 to present notifications via a display (e.g., touch screen, liquid crystal display (LCD), hardware surface display, etc.), speakers, or the like. As a non-limiting example, FIG. 1 illustrates that a spreadsheet application presents a spreadsheet and/or potential error notifications on a display of the user device 102.

In various implementations, the spreadsheet application and/or the error detection tool can be implemented remotely via a service provider 124. The service provider 124 can be any entity or platform that facilitates creation of spreadsheets, storage of spreadsheets, and/or error detection in spreadsheets. The service provider 124 can be implemented in a non-distributed computing environment or can be implemented in a distributed computing environment. The service provider 124 can include one or more devices 126 (e.g., servers), which can include processor(s) 128 and memory 130. Examples of processor(s) 128 are described above (e.g., with respect to processor(s) 108). Examples of memory 130 are also described above (e.g., with respect to memory 110). Memory 130 can include one or more network-based modules 132 (e.g., a network-based partitioning module and/or a network-based error detection module the same or similar to those described with respect to the user device 102).

The service provider 124 is configured to communicate with the user device 102 via networks 134. The network(s) 134 can comprise a wide area network (WAN), a local area network (LAN), a personal area network (PAN), a network specific to a datacenter (e.g., an Intranet, a storage area network (SAN)), a mobile telephone network (MTN), etc. A network 134 can also comprise switches that connect various devices to routers and/or other devices that can act as bridges between data networks.

The processes described in FIGS. 2 and 3 below are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 2:
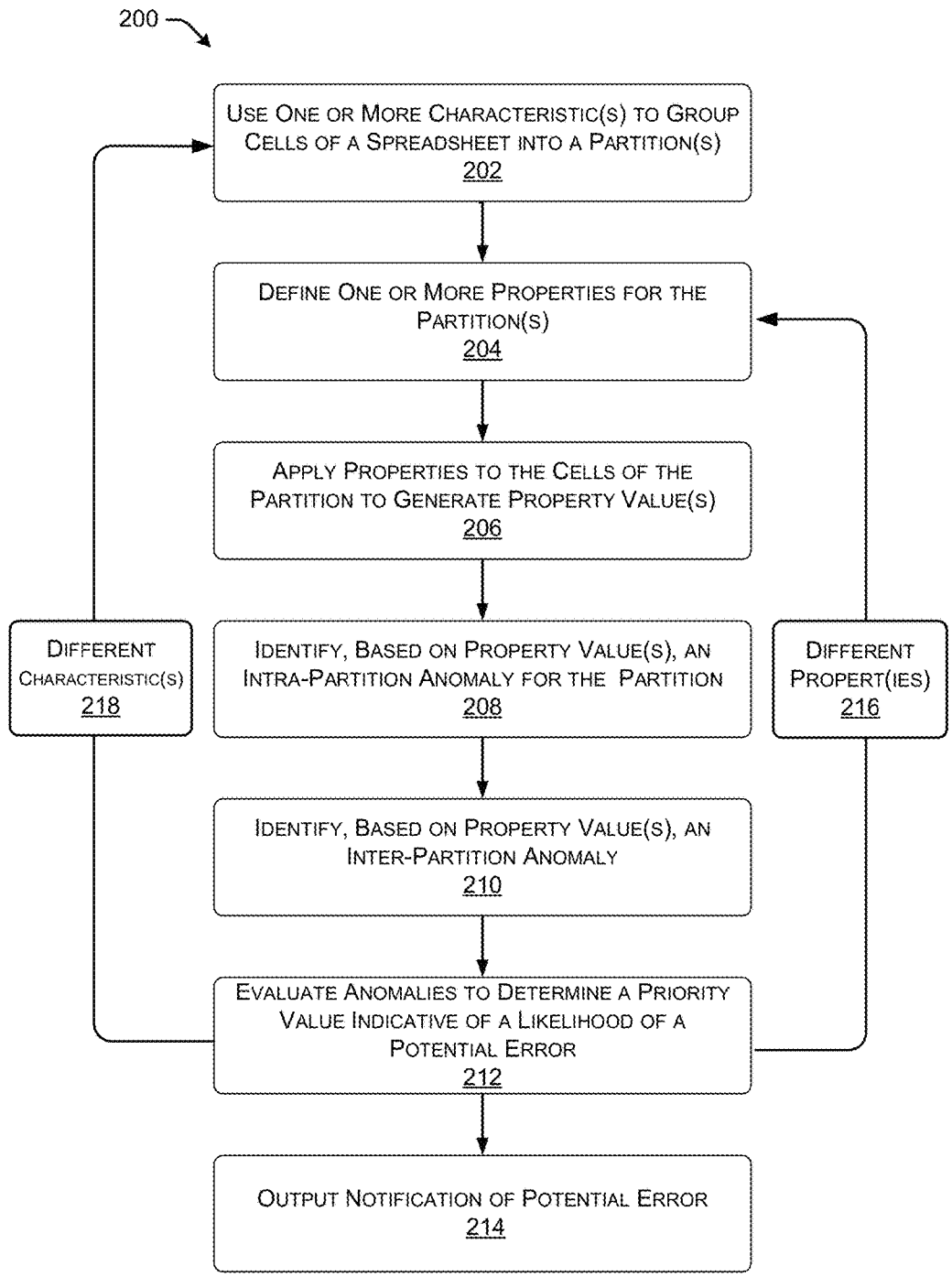
FIG. 2 illustrates a flow diagram of an example process that uses defined characteristics and defined properties to identify an intra-partition anomaly and/or an inter-partition anomaly which are useable to detect potential errors in a spreadsheet.

FIG. 2 illustrates a flow diagram of an example process 200 that uses defined characteristics and defined properties to identify an intra-partition anomaly and/or an inter-partition anomaly which are useable to detect potential errors in a spreadsheet. The example process 200 can be implemented by the modules of the user device 102 and/or the service provider 124, as described in the example environment 100 of FIG. 1. The example process 200 can be implemented by other devices and/or in other environments as well.

At 202, one or more characteristics are defined and used to group cells of a spreadsheet into a partition. For instance, the partitioning module 112 can define one or multiple characteristics 116 useable to analyze the cells to determine a partition to which an individual cell belongs. In one example, each of the cells of a spreadsheet, or an identified section of a spreadsheet (e.g., a section that is adjacent to empty cells or unused space that distinguishes one section from a next section), can belong to one of multiple non-overlapping partitions (e.g., the cells are divided into "row" partitions, the cells are divided into "column" partitions, etc.). In another example, cells of a spreadsheet, or an identified section of the spreadsheet, can belong to multiple ones of multiple overlapping partitions (e.g., overlapping blocks of cells). In yet another example, a characteristic 116 can be used to target, for evaluation, a subset of a total number of cells in a spreadsheet or an identified section of a spreadsheet, such that not all the cells of the spreadsheet or the identified section of the spreadsheet belong to a partition (e.g., only one partition with the subset of cells is created).

At 204, one or more properties are defined for the partition, or for multiple partitions (e.g., rows, columns, etc.). For instance, the partitioning module 112 can select a property 118 from a group of known properties 118. As described above, a property 118 can be useable to generate a numeric representation of a cell and/or a partition.

At 206, the properties are applied to the cells of a partition to generate property values. For example, Boolean values can be property values generated based on defined properties that are applied (e.g., a "true" value indicating that a cell has a particular formatting characteristic, a "true" value indicating that a cell has a particular content type characteristic, etc.).

At 208, an intra-partition anomaly can be identified based on the property values. An intra-partition anomaly occurs when a cell in a partition has a property value that is inconsistent with other property values of other cells in the same partition. For instance, the partitioning module 112 can determine a statistical distribution of the partition based on the generated property values associated with the cells of the partition and use the statistical distribution to identify an intra-partition anomaly. In a first specific example, if there are thirty cells in a column partition, and twenty-nine of the thirty cells ("29/30") have a numeric value within a defined value range (e.g., the property defined for the column partition based on expected or acceptable values), then the cell that has the numeric value outside the defined value range is evaluated to a "zero" or "false" property value, and therefore, is associated with an intra-partition anomaly. In a second specific example, the statistical distribution of the partition may yield a property value that is outside a threshold (e.g., a standard deviation band of a mean property value), and thus, the cell associated with the outlying property value can be identified as anomalous. In various implementations, a difference can be associated with an intra-partition anomaly based on a computed outlying distance, and the difference can contribute to the evaluation of a priority value.

At 210, an inter-partition anomaly can be identified based on the property values. An inter-partition anomaly occurs when a cell in the partition has a property value that is inconsistent with property values of cells in other partition(s). For instance, the partitioning module 112 can determine a statistical distribution for each partition in a set of partitions (e.g., each row, each column, etc.) based on the generated property values and compare the statistical distributions to identify an inter-partition anomaly. In the first specific example from the preceding paragraph, if the statistical distributions from other partitions (e.g., columns) reflect that thirty of thirty cells ("30/30") have a numeric value within the defined value range, then the comparison of statistical distributions across partitions yields that an inter-partition anomaly is associated with the partition in which twenty-nine of the thirty cells ("29/30") have a numeric value within a defined value range. Moreover, the one cell that has the numeric value outside the defined value range can be evaluated with respect to similarly situated cells in the other partitions (which contain values within the specific value range), and based on this evaluation, the cell can be associated with an inter-partition anomaly in addition to the intra-partition anomaly already identified. This increases the likelihood that the individual cell contains a potential error. However, if the statistical distributions from other partitions reflect that twenty-nine of thirty cells ("29/30") have a numeric value within the defined value range, then the comparison of statistical distributions across partitions would not yield an inter-partition anomaly, and this may decrease the likelihood that the individual cell associated with the intra-partition already identified contains a potential error (e.g., because similar situated cells in the other partitions consistently contain the same anomalous intra-partition property value which may signal intent of a spreadsheet user).

At 212, the identified anomalies are evaluated to determine a priority value indicative of a likelihood of a potential error. For example, the error detection module 114 can consider a number of anomalies associated with a particular cell such that a higher number of identified anomalies can cause a higher priority value indicating that an individual cell likely contains an error. Moreover, the error detection module 114 can consider whether an anomaly associated with a particular cell is expected, and therefore, the anomaly is not likely a good indication of an error. In some instances, the error detection module 114 can assign different weights to different anomalies when determining a priority value, where the weights are established and vary based on an importance of the one or more characteristics and/or one or more properties used to identify the anomaly. Furthermore, the error detection module 114 can then rank the priority values to determine a subset of potential errors that should be made visible to a user, without overloading the user with false positives.

At 214, a notification of a potential error is output. For example, the error detection module 114 can determine priority values that exceed a threshold priority value when determining the subset of potential errors to which a user is to be notified. In various examples, the notification can visually distinguish cells that likely contain a potential error from other cells, as described above.

In various implementations, subsequent to the evaluation at 212 and/or prior to the output of the notification at 214, the example process can return to operation 204 and define different propert(ies) (e.g., as referenced by 216 and the arrow from 212 to 204). Therefore, subsequent evaluation iterations associated with different properties defined for the same partition(s) can be evaluated, and additional anomalies can be identified to improve a priority value (e.g., adjust a priority value up or down which can be reflective of confidence that the evaluation of whether there is an error is reliable and/or accurate).

Further, in various implementations, subsequent to the evaluation at 212 and after one or more evaluation iterations associated with different properties defined for the same partition(s), the example process can return to operation 202 and define different characteristic(s) (e.g., as referenced by 218 and the arrow from 212 to 202). Therefore, subsequent partitioning iterations associated with different characteristics used to determine new partition(s) (e.g., a partitioning session) can be implemented, and even more anomalies can be identified to improve the priority value. Stated another way, if a cell contributes to an increasing number of anomalies, then the cell is more likely to contain an error will be ranked higher based on the priority value. For example, an individual cell may be determined to be anomalous not only as part of a first partition, but also as part of subsequent partitions that are different than that first partition (e.g., the individual cell may be associated with an intra-partition anomaly and an inter-partition anomaly when the spreadsheet is divided into row partitions and the same individual cell may be associated with an intra-partition anomaly and an inter-partition anomaly when the spreadsheet is divided into column partitions).

Figure 3:
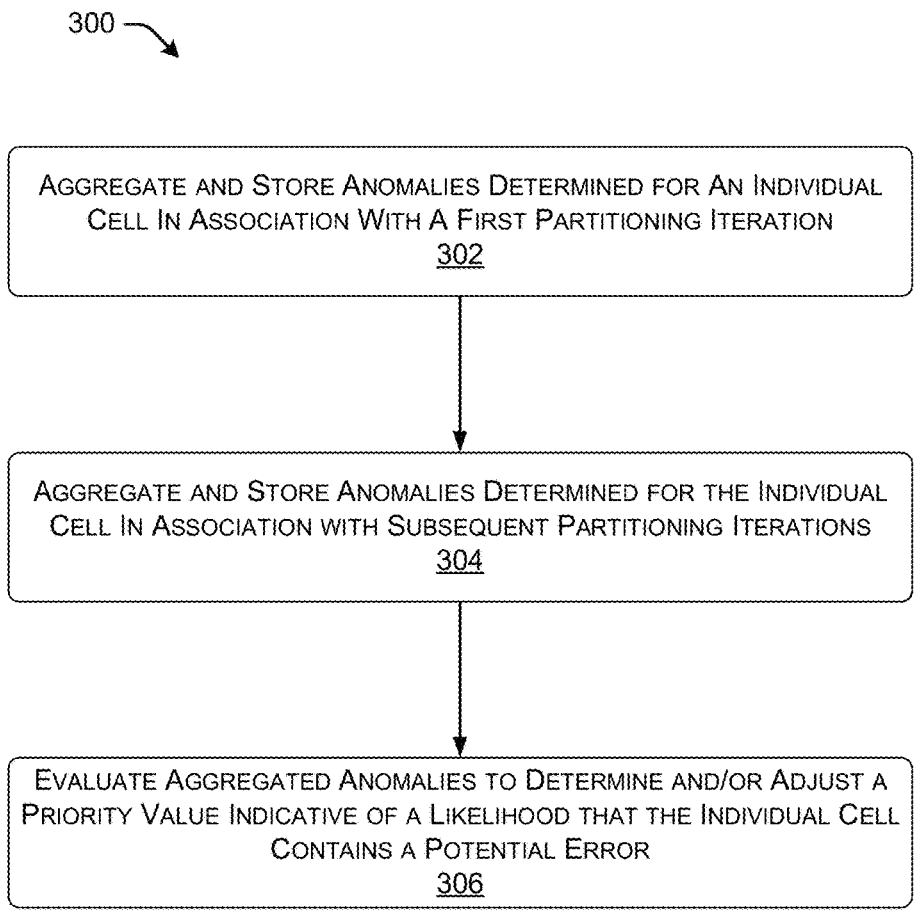
FIG. 3 illustrates a flow diagram of an example process that aggregates intra-partition anomalies and/or inter-partition anomalies, the aggregated anomalies being useable to detect potential errors in a spreadsheet.

FIG. 3 illustrates a flow diagram of an example process 300 that aggregates intra-partition anomalies and/or inter-partition anomalies, the aggregated anomalies being useable to detect potential errors in a spreadsheet. The example process 300 can be implemented by the modules of the user device 102 and/or the service provider 124, as described in the example environment 100 of FIG. 1. The example process 300 can be implemented by other devices and/or in other environments as well.

At 302, anomalies determined for an individual cell are aggregated and stored in association with a first partitioning iteration (e.g., a first partitioning session). For example, the error detection module 114 may store a cell identifier (e.g., cell "A4" of spreadsheet "XYZ") and the identified anomalies (e.g., including characteristics and properties used to identify an anomaly) together in an anomaly database.

Operation 302 can be associated with operations 202, 204, 206, 208, and 210 from the example process 200 of FIG. 2.

At 304, anomalies determined for an individual cell are aggregated and in association with subsequent partitioning iterations. Similarly, operation 304 can also be associated with subsequent iterations of operations 202, 204, 206, 208, and 210 from the example process 200 of FIG. 2.

At 306, the aggregated anomalies are evaluated to determine and/or adjust a priority value indicative of a likelihood that the individual cell contains a potential error. Consequently, using multiple partitioning iterations, where each partitioning iteration can include multiple evaluation iterations (e.g., changing properties evaluated on the same partition(s)), a combined set of anomalies can be identified to establish a more reliable priority value.

Figure 4:
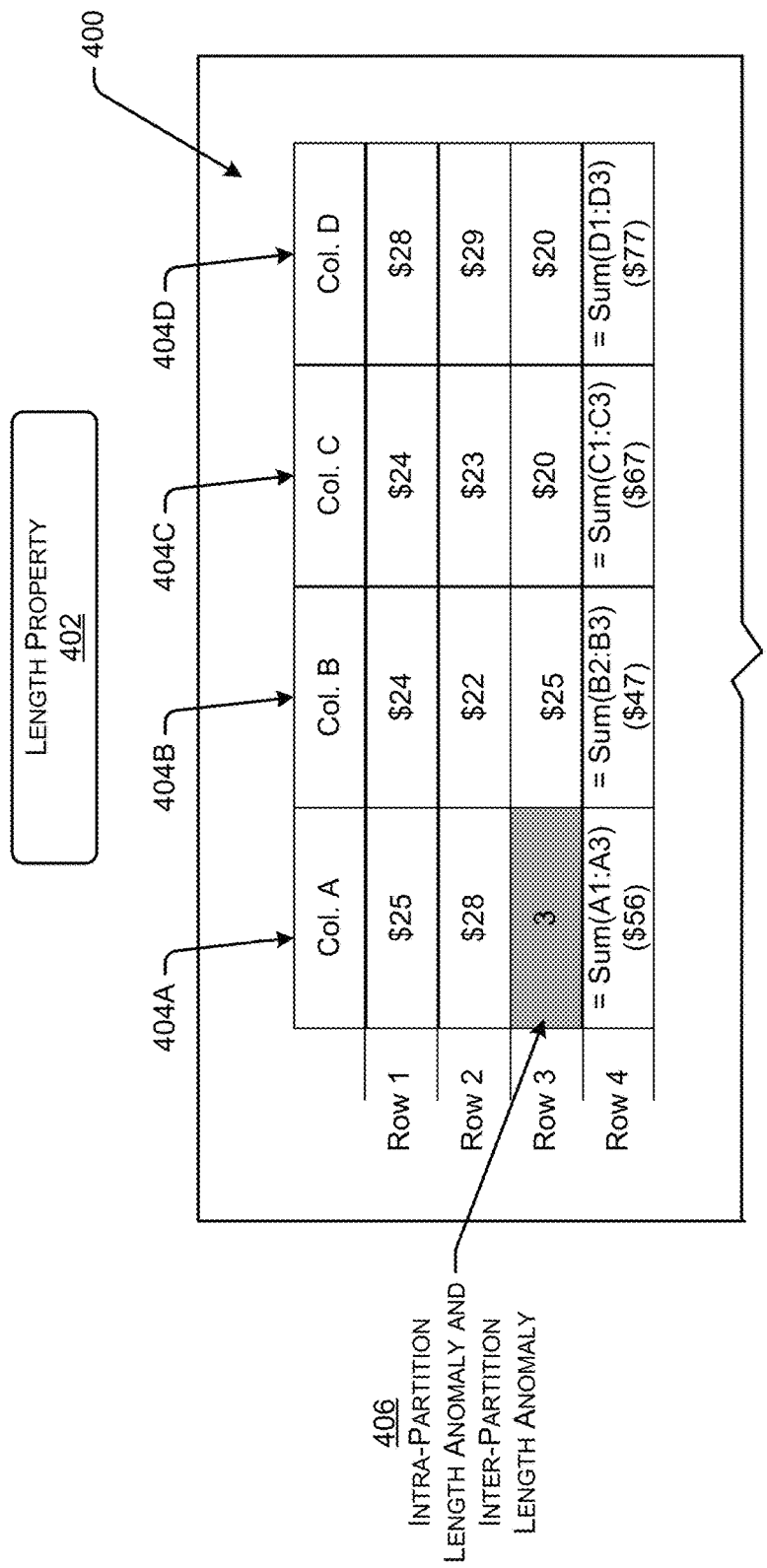
FIG. 4 illustrates an example spreadsheet that includes partitions within which an anomaly can be identified based on a defined property.

FIG. 4 illustrates an example spreadsheet 400 that includes partitions within which an anomaly associated with a cell can be identified based on a defined property (e.g., a property 118). In FIG. 4, the defined property 118 comprises a length property 402 (e.g., a length of content), and the characteristic 116 used to determine a partition is a column. Thus, the example spreadsheet 400 is divided into four (4) partitions 404(A-D): "Col. A" referenced by 404A, "Col. B" referenced by 404B, "Col. C" referenced by 404C, and "Col. D" referenced by 404D. The length property 402 is used to generate, as property values, a number of characters in individual cells of the example spreadsheet 400. Accordingly, in this example, cells A1 ("$25"), A2 ("$28"), A4 ("$56" after the formula is computed), B1 ("$24"), B2 ("$22"), B3 ("$25"), B4 ("$47" after the formula is computed), C1 ("$24"), C2 ("$23"), C3 ("$20"), C4 ("$67" after the formula is computed), D1 ("$28"), D2 ("$29"), D3 ("$20"), and D4 ("$77" after the formula is computed) all have a length of three (3), because there are two digits and a "$" symbol in each of these cells. However, cell A3, which is part of partition 404A, has a property value of one (1) because it only includes one digit and there is not a "$" symbol. Thus, the partitioning module 112 can identify cell A3 as being anomalous to other cells in its own partition (e.g., an intra-partition anomaly) and can identify cell A3 as being anomalous to other cells (e.g., similarly situated cells B3, C3, and D3) in other partitions (e.g., an inter-partition anomaly), as referenced by 406. In various examples, the error detection module 114 can compute and/or assign a priority value to cell A3 based on the intra-partition anomaly and the inter-partition anomaly. For instance, the priority value may initially be one (1) out of ten (10) based on the intra-partition anomaly associated with cell A3 in FIG. 4 and may increase to two (2) out of ten (10) based on the inter-partition anomaly associated with cell A3 in FIG. 4.

Figure 5:
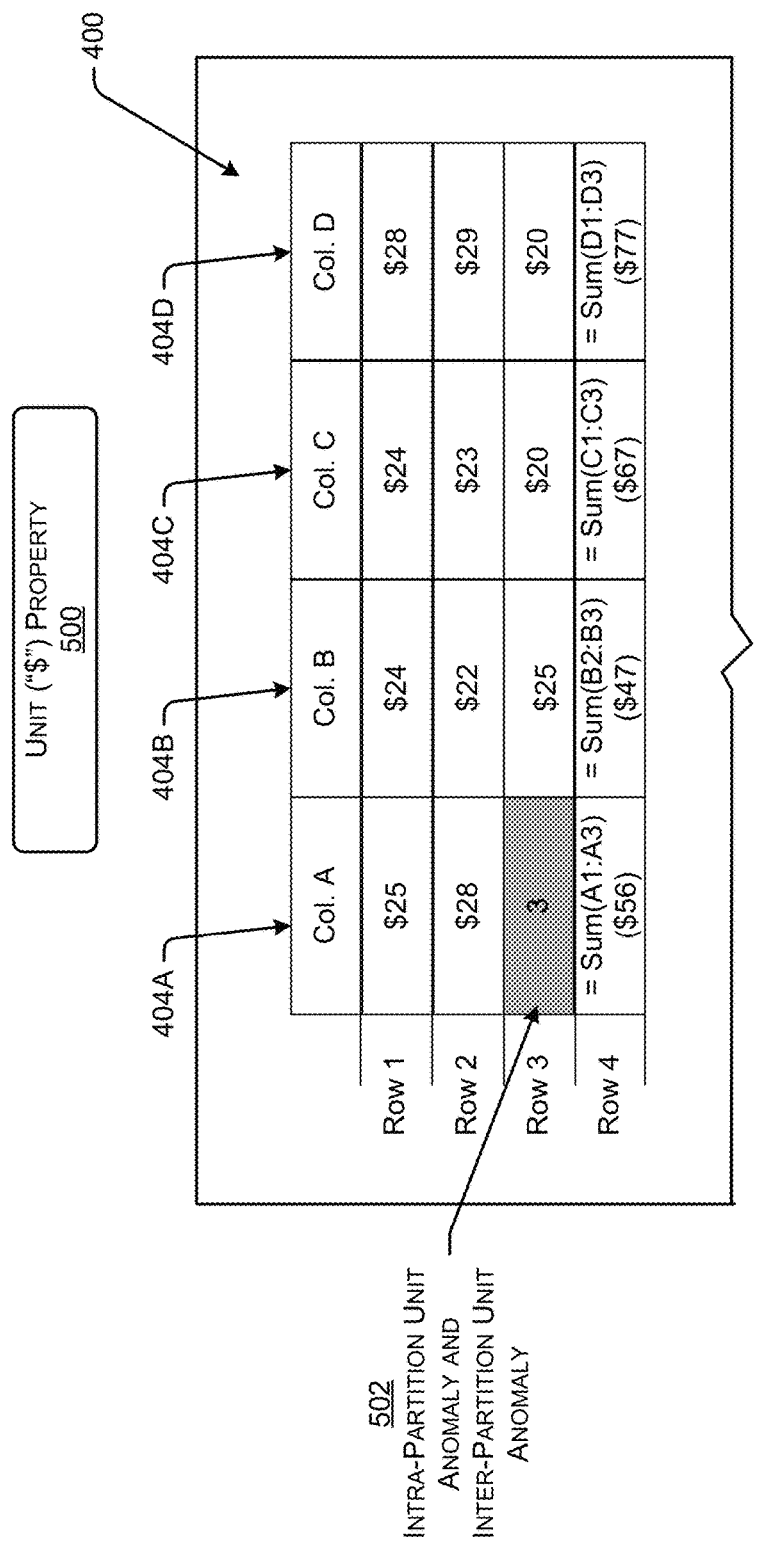
FIG. 5 illustrates the example spreadsheet that includes partitions within which another anomaly can be identified based on another defined property.

FIG. 5 illustrates the same example spreadsheet 400 that includes the same partitions 404(A-D) within which another anomaly associated with the same cell (A3) can be identified based on another defined property. In FIG. 5, the property is a unit ("$") property 500, and thus, is different than the length property 402 in FIG. 4. In this example, the unit ("$") property 500 is used to generate, as property values, a Boolean value for individual cells of the example spreadsheet 400. That is, cells that include the "$" unit have a property value of "one" or "true" while cells that do not include the "$" unit have a property value of "zero" or "true". Accordingly, in this example, cells A1, A2, A4, B1, B2, B3, B4, C1, C2, C3, C4, D1, D2, D3, and D4 all have a property value of "one" or "true" because all these cells include the "$" unit, and thus, satisfy the unit ("$") property 500. However, cell A3, which is part of partition 404A, has a property value of "zero" or "false" because it does not include the "$" unit. Thus, the partitioning module 112 can identify cell A3 as being anomalous to other cells in its own partition (e.g., an intra-partition anomaly) and can identify cell A3 as being anomalous to other cells (e.g., similarly situated cells B3, C3, and D3) in other partitions (e.g., an inter-partition anomaly), as referenced by 502. In various examples, the error detection module 114 can re-compute and/or adjust the priority value to cell A3 based on the intra-partition anomaly and the inter-partition anomaly in FIG. 5. For instance, continuing on from the example in FIG. 4, the priority value may increase from (2) out of ten (10) to three (3) out of ten (10) based on the intra-partition anomaly associated with cell A3 in FIG. 5 and may further increase to four (4) out of ten (10) based on the inter-partition anomaly associated with cell A3 in FIG. 5.

Figure 6:
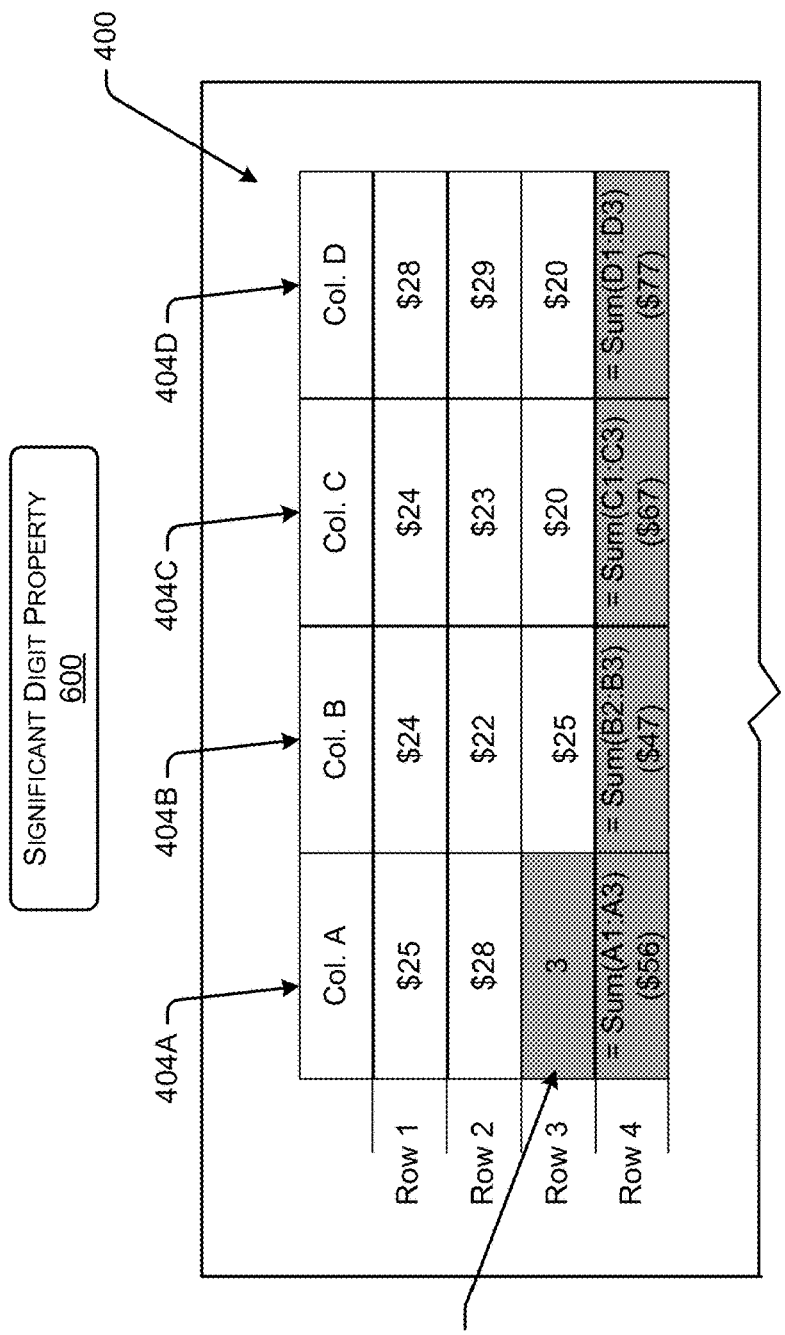
FIG. 6 illustrates the example spreadsheet that includes partitions within which yet another anomaly can be identified based on yet another defined property.

FIG. 6 further illustrates the same example spreadsheet 400 that includes the same partitions 404(A-D) within which yet another anomaly associated with the same cell (A3) can be identified based on yet another defined property. In FIG. 6, the property is a significant digit property 600, and thus, is different than the length property 402 in FIG. 4 and the unit ("$") property 500 in FIG. 5. In this example, the significant digit property 600 is used to determine, as property values, a first digit in the numbers of the cells. Moreover, a statistical distribution can be generated based on the property values. Accordingly, in this example, cells A1, A2, B1, B2, B3, C1, C2, C3, D1, D2, and D3 all have a property value of two (2) because the first digit in all these cells is two (2). In each partition 404(A-B), the most common property value is two (2). Consequently, cells A3 (with a significant digit of "3"), A4 (with a significant digit of "5"), B4 (with a significant digit of "4"), C4 (with a significant digit of "6"), and D4 (with a significant digit of "7") have a property value that is inconsistent, or anomalous, to the most common property value of two (2) (e.g., there is no match). Thus, the partitioning module 112 can identify cells A3, A4, B4, C4, and D4 as being anomalous to other cells in their respective partitions (e.g., an intra-partition anomaly). However, the partitioning module 112 can only identify cell A3 as being anomalous to other cells (e.g., similarly situated cells B3, C3, and D3) in other partitions (e.g., an inter-partition anomaly), as referenced by 602, because each cell in row four (4) is associated with an intra-partition anomaly, thereby indicating that these identified intra-partition anomalies may not be a good signal to use for error detection (e.g., because this row includes formulas). In various examples, the error detection module 114 can re-compute and/or adjust the priority value to cell A3 based on the intra-partition anomaly and the inter-partition anomaly in FIG. 6. For instance, continuing on from the examples in FIG. 4 and FIG. 5, the priority value may increase from four (4) out of ten (10) to five (5) out of ten (10) based on the intra-partition anomaly associated with cell A3 in FIG. 6 and may further increase to six (6) out of ten (10) based on the inter-partition anomaly associated with cell A3 in FIG. 6.

As illustrated and described with respect to FIGS. 4-6, the techniques described herein can use different properties and statistical reasoning to improve error detection in spreadsheets by aggregating identified anomalies and using the anomalies to determine a priority value, which represents a confidence the tool has with respect to error detection.

Figure 7:
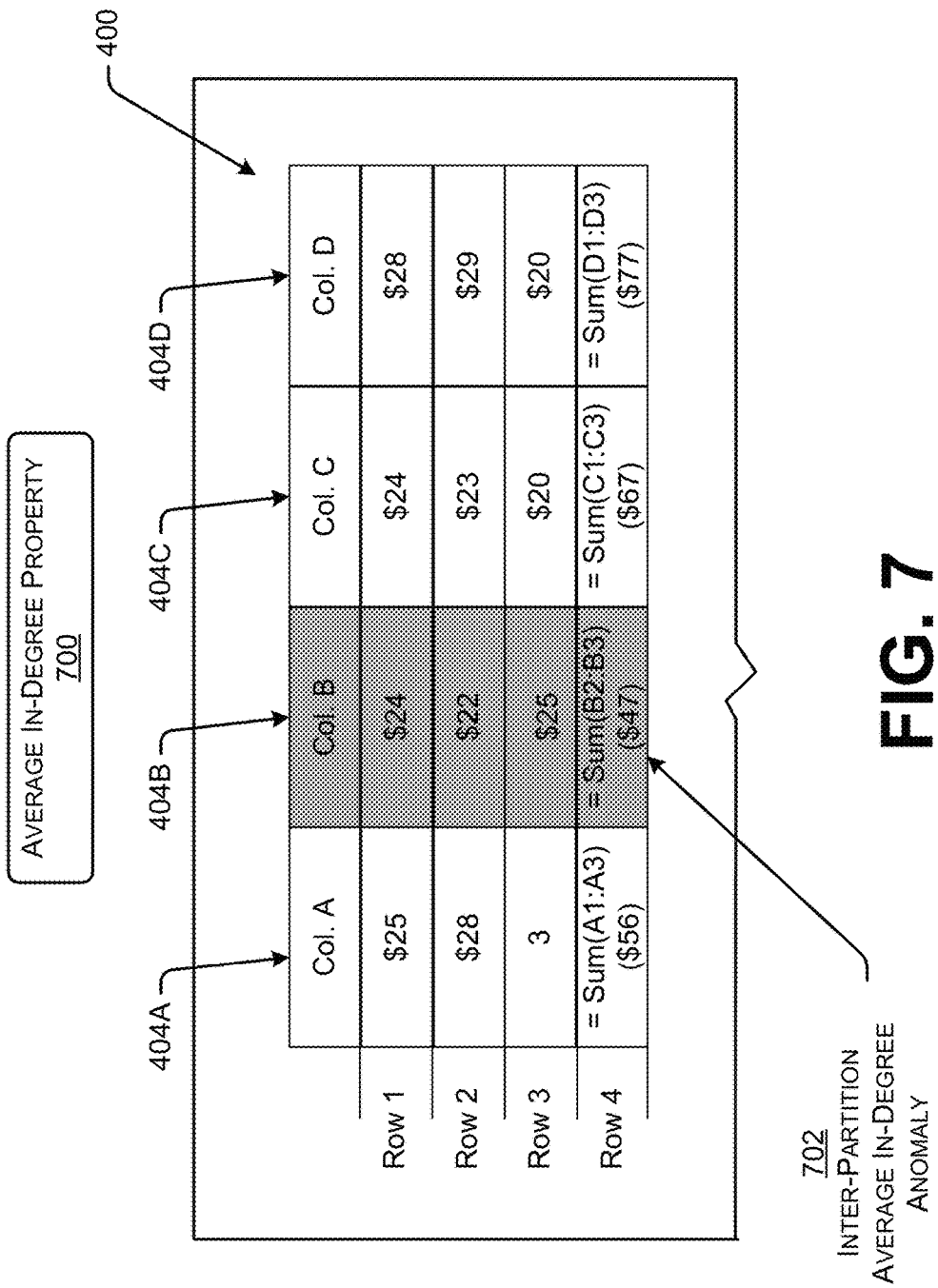
FIG. 7 illustrates the example spreadsheet that includes partitions within which a further anomaly can be identified based on a defined property.

FIG. 7 further illustrates the same example spreadsheet 400 that includes the same partitions 404(A-D) within which an anomaly associated with a partition can be identified based on a defined property. In FIG. 7, the property is an average in-degree property 700. In this example, the average in-degree property 700 is used to determine, as a property value, the average in-degree for a partition. The average in-degree can be calculated based on the in-degree values of the individual cells within a partition. In this example, partition 404(A) has an average in-degree value of "0.75" (e.g., ¾) because A1, A2, and A3 have an in-degree value of zero and A4 has an in-degree value of three. Moreover, partition 404(B) has an average in-degree value of "0.50" (e.g., 2⁄4) because B 1, B2, and B3 have an in-degree value of zero and B4 has an in-degree value of two. Partition 404(C) has an average in-degree value of "0.75" (e.g., ¾) because C1, C2, and C3 have an in-degree value of zero and C4 has an in-degree value of three. Finally, partition 404(D) has an average in-degree value of "0.75" (e.g., ¾) because D1, D2, and D3 have an in-degree value of zero and D4 has an in-degree value of three. Accordingly, partition 404(B) has a property value that is inconsistent, or anomalous, to the most common property value of other partitions. Thus, the partitioning module 112 can identify partition 404(B) as being anomalous to other partitions (e.g., an intra-partition anomaly). In this example, the partitioning module 112 can determine to continue evaluation iterations and/or partitioning iterations to attempt to identify a specific cell in partition 404(B) that likely contains an error.

Figure 8:
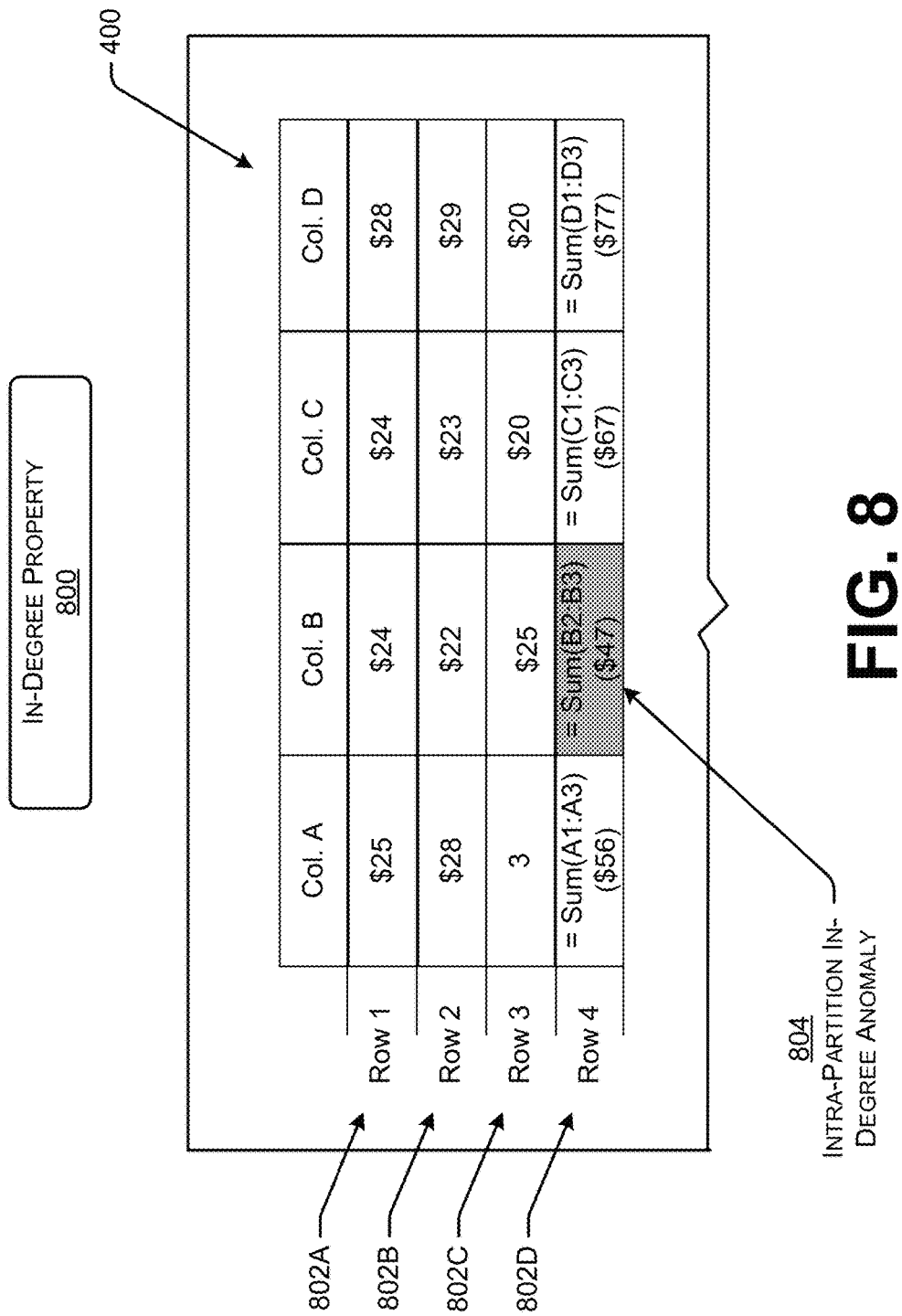
FIG. 8 illustrates the example spreadsheet that includes different partitions within an additional anomaly can be identified based on a defined property.

For instance, FIG. 8 illustrates the example spreadsheet 400 that includes different partitions within which an anomaly associated with an individual cell can be identified based on defined property. In FIG. 8, the defined property comprises an in-degree property 800, and in FIG. 8, the characteristic 116 is switched to create different partitions (e.g., the row characteristic is defined). Thus, the example spreadsheet 400 is divided into four (4) partitions 802(A-D): "Row 1" referenced by 802A, "Row 2" referenced by 802B, "Row 3" referenced by 802C, and "Row 4" referenced by 802D. The in-degree property 800 is used to generate, as property values, an in-degree value of individual cells in the example spreadsheet 400. Accordingly, in this example, cells A1, A2, A3, B1, B2, B3, C1, C2, C3, D1, D2, and D3 (e.g., partitions 802(A-C) all have a property value of zero because the cells do not import, or rely upon, content from other cells. Moreover, cells A4, C4, and D4 in partition 802D each have a property value of three (3) because these cells import, or rely upon, content from three other cells. However, cell B4 in partition 802D has a property value of two (2) because this cell only imports, or relies upon, content from two other cells. Thus, the partitioning module 112 can identify cell B4 as being anomalous to other cells in its own partition (e.g., an intra-partition anomaly), as referenced by 804.

As illustrated and described with respect to FIGS. 7-8, the techniques described herein can use combination of different characteristics and different properties along with statistical reasoning to improve error detection in spreadsheets by aggregating identified anomalies and using the anomalies to determine a priority value, as described herein.

EXAMPLE CLAUSES

Example A, a device comprising: one or more processors; and memory that stores instructions that, when executed by the one or more processors, cause the device to: determine a partition within a spreadsheet, the partition including a plurality of cells that share a characteristic; define a property for the partition; apply the property to each cell of the plurality of cells included in the partition to generate a property value associated with each cell; determine a statistical distribution of the partition based on the plurality of property values respectively associated with the plurality of cells included in the partition; identify, based at least in part on the statistical distribution of the partition, an intra-partition anomaly in which a cell of the plurality of cells included in the partition has an associated property value that is anomalous to other property values associated with other cells of the plurality of cells included in the partition; compare the statistical distribution of the partition to other statistical distributions of other partitions to identify an inter-partition anomaly in which the associated property value of the cell is also anomalous to other property values associated with other similarly situated cells of the other partitions; and determine, based at least in part on the intra-partition anomaly and the inter-partition anomaly, a priority value indicative of a likelihood that the cell of the plurality of cells included in the partition comprises a potential error.

Example B, the device of Example A, wherein the instructions further cause the device to output, based at least in part on the priority value, a notification indicating that the cell comprises a potential error.

Example C, the device of Example A or Example B, wherein the characteristic comprises: a row characteristic such that the plurality of cells belong to a same row in the spreadsheet; or a column characteristic such that the plurality of cells belong to a same column in the spreadsheet.

Example D, the device of Example A or Example B, wherein the characteristic comprises a type of content characteristic such that the plurality of cells have a same type of content, the type of content characteristic comprising one of a numeric value characteristic, a text string characteristic, or a formula characteristic.

Example E, the device of Example A or Example B, wherein the characteristic comprises a cell format characteristic such that the plurality of cells have a same cell format, the cell format characteristic comprising a highlight characteristic, a content color characteristic, a hidden content characteristic, a type of font characteristic, or a bolded content characteristic.

Example F, the device of Example A or Example B, wherein the characteristic comprises a semantic unit characteristic such that the plurality of cells have a same semantic unit.

Example G, the device of any one of Examples A through F, wherein: the property comprises one of: an existence of content, a type of content, a range of values, a semantic unit, a cell format, an operation used in a formula; and the property value is a Boolean value such that if content contained in an individual cell satisfies the property then the property value is true and if the content contained in the individual cell does not satisfy the property then the property value is false.

Example H, the device of any one of Examples A through F, wherein the property comprises: a number of times an individual cell uses content from other cells; or a number of times content of an individual cell is used by other cells.

While Examples A through H are provided above with respect to a device, it is understood in the context of this document that the subject matter of Examples A through H can be implemented via a method and/or via instructions stored on computer readable storage media.

Example I, a method comprising: determining partitions within a spreadsheet, an individual partition including a plurality of cells that share at least one characteristic; applying a property to each cell of the plurality of cells included in individual ones of the partitions to generate property values; summarizing, for individual ones of the partitions, the property values to generate respective summaries for the partitions; comparing the summaries to identify an inter-partition anomaly amongst the partitions; and determining, based at least in part on the inter-partition anomaly, a priority value indicative of a likelihood that a particular partition or a particular cell comprises a potential error.

Example J, the method of Example I, further comprising: applying a second property to each cell of the plurality of cells included in individual ones of the partitions to generate second property values; summarizing, for individual ones of the partitions, the second property values to generate respective second summaries for the partitions; comparing the second summaries to identify a second inter-partition anomaly amongst the partitions, the second inter-partition anomaly associated with the particular partition or the particular cell; and increasing the priority value indicative of the likelihood that the particular partition or the particular cell comprises the potential error.

Example K, the method of Example I, wherein the property comprises: a number of times an individual cell uses content from other cells; or a number of times content of an individual cell is used by other cells.

Example L, the method of Example K, wherein, for an individual partition, a summary comprises an average of the number of times an individual cell uses content from other cells or an average of the number of times content of an individual cell is used by other cells.

Example M, the method of any one of Example I through K, wherein the at least one characteristic is selected from a group comprising: a row characteristic such that the plurality of cells belong to a same row in the spreadsheet; a column characteristic such that the plurality of cells belong to a same column in the spreadsheet; a type of content characteristic such that the plurality of cells have a same type of content, the type of content characteristic comprising one of a numeric value characteristic, a text string characteristic, or a formula characteristic; a cell format characteristic such that the plurality of cells have a same cell format, the cell format characteristic comprising a highlight characteristic, a content color characteristic, or a hidden content characteristic; or a semantic unit characteristic such that the plurality of cells have a same semantic unit.

Example N, the method of Example I, wherein: the property comprises one of: an existence of content, a type of content, a range of values, a semantic unit, a cell format, an operation used in a formula; and the property value is a Boolean value such that if content contained in an individual cell satisfies the property then the property value is true and if the content contained in the individual cell does not satisfy the property then the property value is false.

Example O, the method of Example J, wherein: the second property comprises one of: an existence of content, a type of content, a range of values, a semantic unit, a cell format, an operation used in a formula; and the second property value is a Boolean value such that if content contained in an individual cell satisfies the second property then the second property value is true and if the content contained in the individual cell does not satisfy the second property then the second property value is false.

While Examples I through O are provided above with respect to a method, it is understood in the context of this document that the subject matter of Examples I through O can be implemented by a device and/or via instructions stored on computer readable storage media.

Example P, a device comprising: one or more processors; and memory that stores instructions that, when executed by the one or more processors, cause the device to: determine a partition within a spreadsheet, the partition including a plurality of cells that share at least one characteristic; define one or more properties for the partition; apply the one or more properties to generate a property value associated with each cell of the plurality of cells included in the partition; identify an anomaly in which a cell of the plurality of cells included in the partition has an associated property value that is anomalous to other property values associated with other cells of the plurality of cells included in the partition; and determine, based at least in part on the anomaly, a priority value indicative of a likelihood that the cell of the plurality of cells included in the partition comprises a potential error.

Example Q, the device of Example P, wherein the instructions further cause the device to output, based at least in part on the priority value, a notification indicating that the cell comprises a potential error.

Example R, the device of Example P or Example Q, wherein the at least one characteristic is selected from a group comprising: a row characteristic such that the plurality of cells belong to a same row in the spreadsheet; a column characteristic such that the plurality of cells belong to a same column in the spreadsheet; a type of content characteristic such that the plurality of cells have a same type of content, the type of content characteristic comprising one of a numeric value characteristic, a text string characteristic, or a formula characteristic; a cell format characteristic such that the plurality of cells have a same cell format, the cell format characteristic comprising a highlight characteristic, a content color characteristic, or a hidden content characteristic; or a semantic unit characteristic such that the plurality of cells have a same semantic unit.

Example S, the device of any one of Examples P through R, wherein: the one or more properties are selected from a group comprising: an existence of content, a type of content, a range of values, a semantic unit, a cell format, an operation used in a formula; and the property value is a Boolean value such that if content contained in an individual cell satisfies the one or more properties then the property value is true and if the content contained in the individual cell does not satisfy the one or more properties then the property value is false.

Example T, the device of any one of Examples P through S, wherein the at least one characteristic and the one or more properties are defined based at least in part on user input.

While Examples P through T are provided above with respect to a device, it is understood in the context of this document that the subject matter of Examples P through T can be implemented via a method and/or via instructions stored on computer readable storage media.

Example U, a device comprising: means for determining a partition within a spreadsheet, the partition including a plurality of cells that share a characteristic; means for defining a property for the partition; means for applying the property to each cell of the plurality of cells included in the partition to generate a property value associated with each cell; means for determining a statistical distribution of the partition based on the plurality of property values respectively associated with the plurality of cells included in the partition; means for identifying, based at least in part on the statistical distribution of the partition, an intra-partition anomaly in which a cell of the plurality of cells included in the partition has an associated property value that is anomalous to other property values associated with other cells of the plurality of cells included in the partition; means for comparing the statistical distribution of the partition to other statistical distributions of other partitions to identify an inter-partition anomaly in which the associated property value of the cell is also anomalous to other property values associated with other similarly situated cells of the other partitions; and means for determining, based at least in part on the intra-partition anomaly and the inter-partition anomaly, a priority value indicative of a likelihood that the cell of the plurality of cells included in the partition comprises a potential error.

Conclusion

Although the subject matter has been described in language specific to structural features and/or methodological acts, it is to be understood that the subject matter defined in the appended claims is not necessarily limited to the specific features or acts described. Rather, the specific features and acts are described as illustrative forms of implementing the claims.

Conditional language such as, among others, "can," "could," "might" or "may," unless specifically stated otherwise, are understood within the context to present that certain examples include, while other examples do not necessarily include, certain features, elements and/or steps. Thus, such conditional language is not generally intended to imply that certain features, elements and/or steps are in any way required for one or more examples or that one or more examples necessarily include logic for deciding, with or without input or prompting, whether certain features, elements and/or steps are included or are to be performed in any particular example. Conjunctive language such as the phrase "at least one of X, Y or Z," unless specifically stated otherwise, is to be understood to present that an item, term, etc. can be either X, Y, or Z, or a combination thereof.

What is claimed is:

1. A device comprising:
   one or more processors; and
   memory that stores instructions that, when executed by the one or more processors, cause the device to:
      determine a partition within a spreadsheet, the partition including a plurality of cells that share a characteristic;
      define a property for the partition;
      apply the property to each cell of the plurality of cells included in the partition to generate a property value associated with each cell;
      determine a statistical distribution of the partition based on the plurality of property values respectively associated with the plurality of cells included in the partition;
      identify, based at least in part on the statistical distribution of the partition, an intra-partition anomaly in which a cell of the plurality of cells included in the partition has an associated property value that is anomalous to other property values associated with other cells of the plurality of cells included in the partition;
      compare the statistical distribution of the partition to other statistical distributions of other partitions to identify an inter-partition anomaly in which the associated property value of the cell is also anomalous to other property values associated with other similarly situated cells of the other partitions; and
      determine, based at least in part on the intra-partition anomaly and the inter-partition anomaly, a priority value indicative of a likelihood that the cell of the plurality of cells included in the partition comprises a potential error.

2. The device as claim 1 recites, wherein the instructions further cause the device to output, based at least in part on the priority value, a notification indicating that the cell comprises the potential error.

3. The device as claim 1 recites, wherein the characteristic comprises:
   a row characteristic such that the plurality of cells belong to a same row in the spreadsheet; or
   a column characteristic such that the plurality of cells belong to a same column in the spreadsheet.

4. The device as claim 1 recites, wherein the characteristic comprises a type of content characteristic such that the plurality of cells have a same type of content, the type of content characteristic comprising one of a numeric value characteristic, a text string characteristic, or a formula characteristic.

5. The device as claim 1 recites, wherein the characteristic comprises a cell format characteristic such that the plurality of cells have a same cell format, the cell format characteristic comprising a highlight characteristic, a content color characteristic, a hidden content characteristic, a type of font characteristic, or a bolded content characteristic.

6. The device as claim 1 recites, wherein the characteristic comprises a semantic unit characteristic such that the plurality of cells have a same semantic unit.

7. The device as claim 1 recites, wherein:
   the property comprises one of: an existence of content, a type of content, a range of values, a semantic unit, a cell format, an operation used in a formula; and
   the property value is a Boolean value such that if content contained in an individual cell satisfies the property then the property value is true and if the content contained in the individual cell does not satisfy the property then the property value is false.

8. The device as claim 1 recites, wherein the property comprises:
   a number of times an individual cell uses content from other cells; or
   a number of times content of an individual cell is used by other cells.

9. A method comprising:
   determining, by a processor, partitions within a spreadsheet, an individual partition including a plurality of cells that share at least one characteristic;
   applying a property to each cell of the plurality of cells included in individual ones of the partitions to generate property values;
   summarizing, for individual ones of the partitions, the property values to generate respective summaries for the partitions;
   comparing the summaries to identify an inter-partition anomaly amongst the partitions; and
   determining, based at least in part on the inter-partition anomaly, a priority value indicative of a likelihood that a particular partition or a particular cell comprises a potential error.

10. The method as claim 9 recites, further comprising:
   applying a second property to each cell of the plurality of cells included in individual ones of the partitions to generate second property values;
   summarizing, for individual ones of the partitions, the second property values to generate respective second summaries for the partitions;
   comparing the second summaries to identify a second inter-partition anomaly amongst the partitions, the second inter-partition anomaly associated with the particular partition or the particular cell; and increasing the priority value indicative of the likelihood that the particular partition or the particular cell comprises the potential error.

11. The method as claim 9 recites, wherein the property comprises:
   a number of times an individual cell uses content from other cells; or
   a number of times content of an individual cell is used by other cells.

12. The method as claim 11 recites, wherein, for an individual partition, a summary comprises an average of the number of times an individual cell uses content from other cells or an average of the number of times content of an individual cell is used by other cells.

13. The method as claim 9 recites, wherein the at least one characteristic is selected from a group comprising:
   a row characteristic such that the plurality of cells belong to a same row in the spreadsheet;
   a column characteristic such that the plurality of cells belong to a same column in the spreadsheet;
   a type of content characteristic such that the plurality of cells have a same type of content, the type of content characteristic comprising one of a numeric value characteristic, a text string characteristic, or a formula characteristic;
   a cell format characteristic such that the plurality of cells have a same cell format, the cell format characteristic comprising a highlight characteristic, a content color characteristic, or a hidden content characteristic; or
   a semantic unit characteristic such that the plurality of cells have a same semantic unit.

14. The method as claim 9 recites, wherein:
   the property comprises one of: an existence of content, a type of content, a range of values, a semantic unit, a cell format, an operation used in a formula; and
   the property value is a Boolean value such that if content contained in an individual cell satisfies the property then the property value is true and if the content contained in the individual cell does not satisfy the property then the property value is false.

15. The method as claim 10 recites, wherein:
   the second property comprises one of: an existence of content, a type of content, a range of values, a semantic unit, a cell format, an operation used in a formula; and
   the second property value is a Boolean value such that if content contained in an individual cell satisfies the second property then the second property value is true and if the content contained in the individual cell does not satisfy the second property then the second property value is false.

16. A device comprising:
   one or more processors; and
   memory that stores instructions that, when executed by the one or more processors, cause the device to:
   determine a partition within a spreadsheet, the partition including a plurality of cells that share at least one characteristic;
   define one or more properties for the partition;
   apply the one or more properties to generate a property value associated with each cell of the plurality of cells included in the partition;
   identify an anomaly in which a cell of the plurality of cells included in the partition has an associated property value that is anomalous to other property values associated with other cells of the plurality of cells included in the partition; and
   determine, based at least in part on the anomaly, a priority value indicative of a likelihood that the cell of the plurality of cells included in the partition comprises a potential error.

17. The device as claim 16 recites, wherein the instructions further cause the device to output, based at least in part on the priority value, a notification indicating that the cell comprises the potential error.

18. The device as claim 16 recites, wherein the at least one characteristic is selected from a group comprising:
   a row characteristic such that the plurality of cells belong to a same row in the spreadsheet;
   a column characteristic such that the plurality of cells belong to a same column in the spreadsheet;
   a type of content characteristic such that the plurality of cells have a same type of content, the type of content characteristic comprising one of a numeric value characteristic, a text string characteristic, or a formula characteristic;
   a cell format characteristic such that the plurality of cells have a same cell format, the cell format characteristic comprising a highlight characteristic, a content color characteristic, or a hidden content characteristic; or
   a semantic unit characteristic such that the plurality of cells have a same semantic unit.

19. The device as claim 16 recites, wherein:
   the one or more properties are selected from a group comprising: an existence of content, a type of content, a range of values, a semantic unit, a cell format, an operation used in a formula; and
   the property value is a Boolean value such that if content contained in an individual cell satisfies the one or more properties then the property value is true and if the content contained in the individual cell does not satisfy the one or more properties then the property value is false.

20. The device as claim 16 recites, wherein the at least one characteristic and the one or more properties are defined based at least in part on user input.

* * * * *